UNITED STATES PATENT OFFICE.

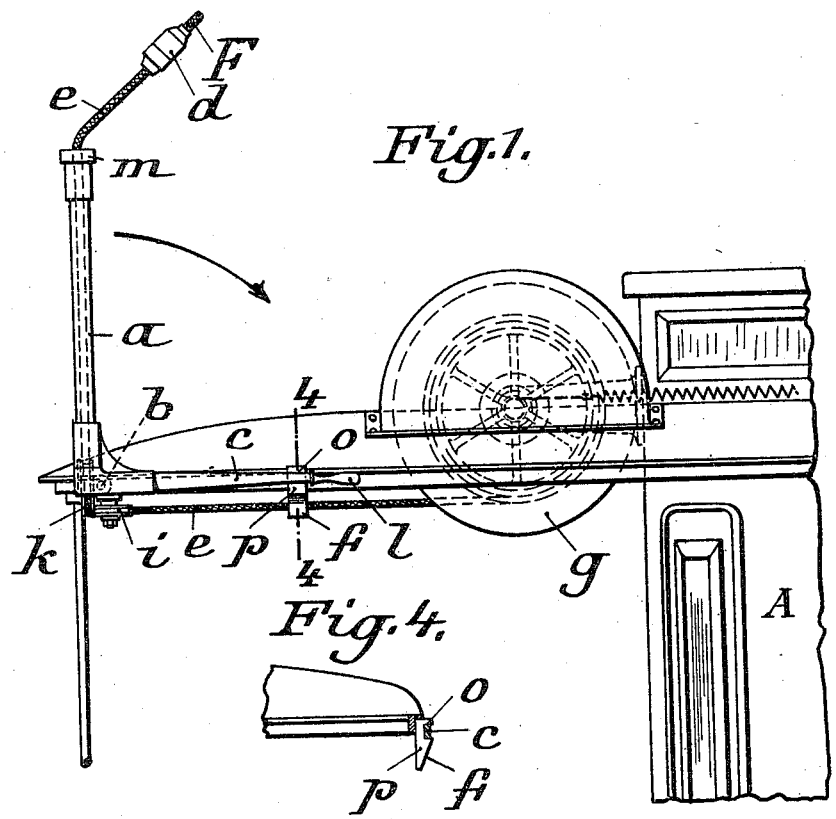
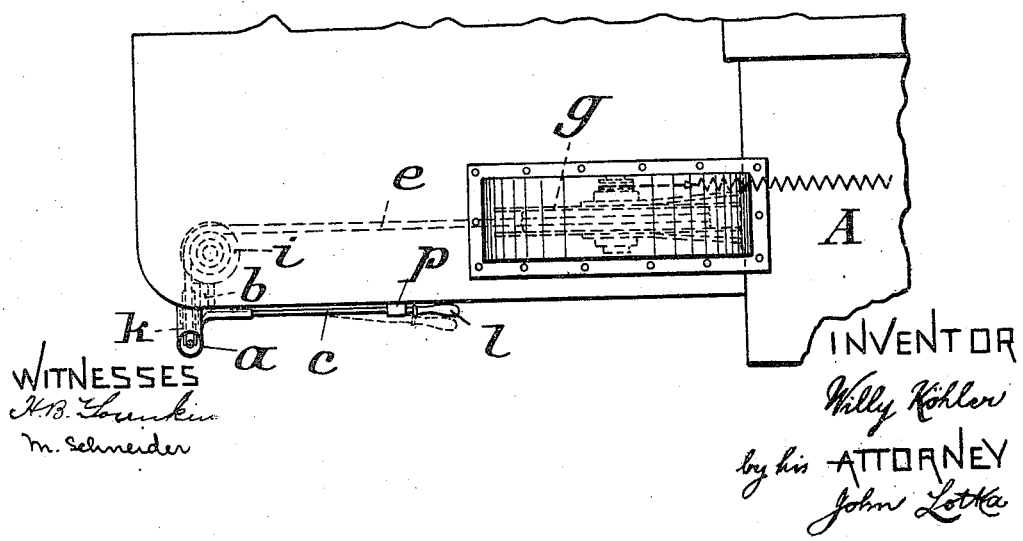

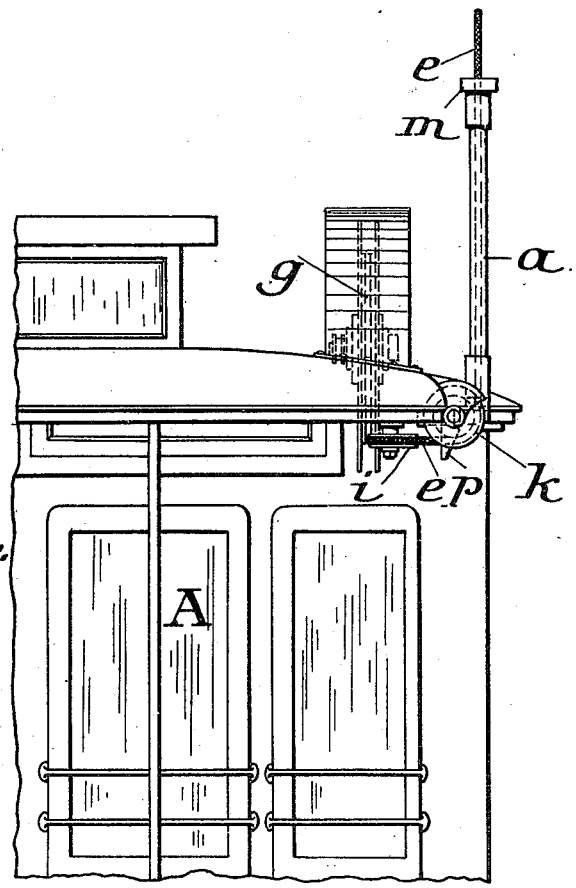
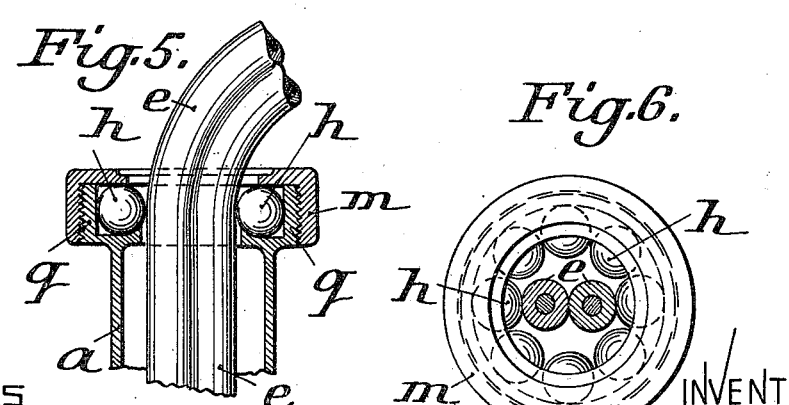

WILLY KÖHLER, OF BREMEN, GERMANY.

ELECTRICALLY-PROPELLED VEHICLE.

972,457.    Specification of Letters Patent.    Patented Oct. 11, 1910.

Application filed March 17, 1910. Serial No. 550,009.

*To all whom it may concern:*

Be it known that I, WILLY KÖHLER, a subject of the German Emperor, residing at 41/43 Obernstrasse, Bremen, Germany, have invented certain new and useful Improvements in Electrically-Propelled Vehicles; and I do hereby declare the following to be a full, clear, and exact description of the invention, such as will enable others skilled in the art to which it appertains to make and use the same.

This invention relates to a device for facilitating the exchange of the current collectors of vehicles propelled electrically from an overhead conductor and traveling without a track. When two or more such vehicles travel along the same road, canal or the like in opposite directions, and both draw current from the same overhead conductor, the current collectors must be exchanged when two vehicles meet. For this purpose there have been provided in the conducting cables plug and socket connections which allow of an easy uncoupling and coupling of the cables with the motor leads.

According to the preferred form of this invention the portion of the conducting cable carried on the vehicle extends through a guide pipe and terminates in a socket adapted to receive the plug connected with the portion of the cable attached to the current collector. This guide pipe is pivoted at a suitable place preferably on the roof of the vehicle above the driver and is held in the working position by a lever which ends in a handle above the driver. By pulling the handle the driver can lower the guide pipe so that the plug and socket come within his reach.

The accompanying drawings illustrate the invention as applied to a car.

Figure 1 is a side elevation, Fig. 2 a front elevation and Fig. 3 a plan of that part of the car which carries the exchanging device. Fig. 4 is a section on line 4—4 of Fig. 1. Fig. 5 is a longitudinal section through the upper end of the guide pipe and Fig. 6 is a plan thereof.

The cable $e$ which conveys the current to the motor, is wound on a drum or pulley wheel $g$ which is situated near the driver's stand. It is led over two rollers $i$ and $k$ and passes from the latter into the protecting guide pipe $a$. At the other end of the guide pipe it terminates in a socket $d$ receiving a plug connected with the collector cable F (Fig. 1). The guide pipe $a$ is pivoted to the roof of the car A at $b$ in such a manner that it cannot swing in a lateral direction, but can be lowered in the line of travel of the car so far that the driver can reach the socket with his hand and disconnect the plug. The lever $c$ serves for lowering the pipe, being rigidly connected with the lower end of the pipe and terminating at its free end in a handle $l$.

To the roof of the car is fixed a projection $p$ having an inclined face $f$ and a notch $o$. The lever $c$, which is so made that it has a certain springiness is moved from below into the working position shown in Fig. 1. It passes over the face $f$ and springs into the notch $o$, fixing the guide pipe in the working position. When the plug is to be exchanged for another one the lever is pressed outward until it can pass freely over the surface $f$ and is then moved downward.

Since in order that the car may swerve the cable $e$ must not have a fixed length, but must be capable of elongation, it is essential that it can run out and be drawn in again through pipe $a$, and in order to make this possible the upper end of the pipe is constructed as shown in Figs. 5 and 6. The pipe terminates at its upper end in a capsule $q$ which can be closed by a screw cap $m$, and contains balls $h$ surrounding the cable. These balls are preferably of insulating material, for example vulcanite.

Having now particularly described and ascertained the nature of my said invention and in what manner the same is to be performed, I declare that what I claim is:—

1. In combination with a trackless vehicle electrically propelled from overhead wires a guide pipe pivoted on a fixed part of the vehicle and attached thereto a lever ending within reach of the driver's hand and adapted to swing said guide tube downward.

2. In combination with a trackless vehicle electrically propelled from overhead wires a guide pipe pivoted on a fixed part of the vehicle, and rigidly attached thereto a lever ending within reach of the driver's hand, means being provided for fixing said lever in such a position as to bring said guide pipe into its operative position.

3. In combination with a trackless vehicle electrically propelled from overhead wires a guide pipe pivoted on a fixed part of the vehicle, and rigidly attached thereto a lever ending within reach of the driver's hand, a block provided on a fixed part of the vehicle and projecting into the path of said lever, said block having a notch adapted to receive said lever and an inclined surface leading up to said notch.

4. In combination with a trackless vehicle electrically propelled from overhead wires a guide pipe fitted with a ball bearing at its upper end, said guide pipe being pivoted to a fixed portion of the vehicle and being provided with a rigidly attached lever ending within reach of the operator's hand, a block attached to a fixed portion of the vehicle and projecting into the path of said lever, said block having a notch adapted to accommodate said lever when in operative position and an inclined surface leading up to said notch.

5. In combination with a trackless vehicle electrically propelled from overhead wires a guide pipe fitted with a ball bearing at its upper end, said guide pipe being pivoted to a fixed portion of the vehicle and being provided with a rigidly attached lever ending within reach of the operator's hand, a block attached to a fixed portion of the vehicle and projecting into the path of said lever, said block having a notch adapted to accommodate said lever when in operative position and an inclined surface leading up to said notch, the said lever having sufficient springiness to ride over said inclined surface.

6. In combination with an electrically propelled vehicle, a conducting cable, a guide for said cable, said guide being carried movably by the vehicle, and an operating member connected with said guide and extending within the driver's reach and adapted to move the guide downward.

7. In combination with an electrically propelled vehicle, a conducting cable, a guide for said cable, said guide being pivoted to the vehicle, and an operating lever attached to said guide and extending within the driver's reach and adapted to move the guide downward.

8. In combination with an electrically propelled vehicle, a conducting cable, a guide for said cable, said guide being carried movably by the vehicle, and an operating member connected with said guide and extending within the driver's reach and adapted to move the guide downward, and means for locking said operating member in its normal position which corresponds to the upper position of the guide.

9. In combination with an electrically propelled vehicle, a conducting cable, a guide for said cable, said guide being pivoted to the vehicle, and an operating lever attached to said guide and extending within the driver's reach and adapted to move the guide downward, and a block attached to the vehicle and provided with a notch into which the lever is adapted to snap when the guide is in its upper position.

10. In combination with an electrically propelled vehicle, a conducting cable, a guide for said cable, said guide being pivoted to the vehicle, and an operating lever attached to said guide and extending within the driver's reach and adapted to move the guide downward, and a block attached to the vehicle in the path of said lever and provided with an inclined face to deflect the lever laterally and with a notch into which the lever is adapted to snap.

In testimony, that I claim the foregoing as my invention, I have signed my name in presence of two subscribing witnesses.

WILLY KÖHLER.

Witnesses:
  FRIEDRICH SCHMIDT,
  FRIEDRICH HOYERMANN.